(12) United States Patent
Chintalapudi et al.

(10) Patent No.: US 8,331,344 B2
(45) Date of Patent: Dec. 11, 2012

(54) LEARNING WIRELESS MEDIUM ACCESS CONTROL FOR DISCRETE EVENT CONTROL SYSTEMS

(75) Inventors: Krishna Kant Chintalapudi, Sunnyvale, CA (US); Lakshmi Venkatraman, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 440 days.

(21) Appl. No.: 12/553,447

(22) Filed: Sep. 3, 2009
(Under 37 CFR 1.47)

(65) Prior Publication Data
US 2011/0051710 A1    Mar. 3, 2011

(51) Int. Cl.
*H04J 3/00*    (2006.01)
(52) U.S. Cl. .................. 370/345; 370/458; 370/478
(58) Field of Classification Search .................. None
See application file for complete search history.

(56) References Cited

U.S. PATENT DOCUMENTS

| | | | |
|---|---|---|---|
| 6,990,317 B2 | 1/2006 | Arnold | |
| 7,046,166 B2 | 5/2006 | Pedyash et al. | |
| 7,099,654 B1 | 8/2006 | Tewfik | |
| 7,120,852 B2 | 10/2006 | Terry et al. | |
| 7,161,926 B2 | 1/2007 | Elson et al. | |
| 8,081,996 B2 * | 12/2011 | Kolavennu et al. | 455/509 |
| 2005/0074025 A1 | 4/2005 | Shao et al. | |
| 2005/0210340 A1* | 9/2005 | Townsend et al. | 714/701 |
| 2006/0136614 A1 | 6/2006 | Kakani et al. | |
| 2007/0076655 A1 | 4/2007 | Manjeshwar et al. | |
| 2007/0258508 A1* | 11/2007 | Werb et al. | 375/140 |
| 2007/0268884 A1* | 11/2007 | Kolavennu et al. | 370/350 |
| 2008/0037431 A1* | 2/2008 | Werb et al. | 370/241 |
| 2008/0037454 A1* | 2/2008 | Werb et al. | 370/310 |
| 2008/0037569 A1* | 2/2008 | Werb et al. | 370/406 |
| 2008/0040509 A1* | 2/2008 | Werb et al. | 709/242 |
| 2009/0207769 A1* | 8/2009 | Park et al. | 370/311 |
| 2009/0323716 A1* | 12/2009 | Chintalapudi et al. | 370/461 |
| 2010/0085954 A1* | 4/2010 | Keshavarzian et al. | 370/343 |

FOREIGN PATENT DOCUMENTS
EP    1 631 018 A1    3/2006

OTHER PUBLICATIONS

Abramson N: "The Throughput of Packet Broadcasting Channels"; IEEE Transactions on Communications, IEEE Service Center, Piscataway, NJ, US; vol. COM-25, No. 1; Jan. 1, 1977; pp. 117-128; XP000809403; ISSN: 0090-6778; p. 118, col. 2, lines 28-36; Abstract (12 pages).

(Continued)

*Primary Examiner* — Bob Phunkulh
(74) *Attorney, Agent, or Firm* — Keith Sweda; Taft Stettinius & Hollister LLP

(57) ABSTRACT

A wireless data transmission method includes providing a plurality of radio frequency transmitters. A receiver is provided to receive transmissions from the transmitters. A data format including a plurality of transmission time slots is defined. A first subset of the plurality of transmitters that are apt to send the transmissions simultaneously is determined. Each of the transmitters in the first subset is assigned to a different one of the time slots. A second subset of the plurality of transmitters that are apt to send the transmissions non-simultaneously is determined. Each of the transmitters in the second subset is assigned to a same one of the time slots. The transmitters are used to transmit the transmissions to the receiver in accordance with the assigning steps.

14 Claims, 7 Drawing Sheets

OTHER PUBLICATIONS

Anonymous: "Extract From IEEE 802.15.4-2006 (Revision of IEEE 802.15.4-2003)—Part 15.4: Wireless Medium Access Control (MAC) and Physical Layer (PHY) Specifications for Low-Rate Wireless Personal Area Networks (WPANs)"; IEEE, [Online]; Sep. 8, 2006, XP002549467; New York, US; Retrieved from the Internet: URL:http://pddocserv/specdocs/data/standards/telecom/IEEE-standards/reading/ieee/std/lanman/restricted/>: [retrieved on Oct. 5, 2009]; (7 pages). p. 14, lines 3-5; p. 17, lines 34-36; p. 18, lines 1-3; p. 19, lines 8-9; p. 170.

Krishna Kant Chintalapudi et al; "On the Design of MAC Protocols for Low-Latency Hard Real-Time Discrete Control Applications over 802.15.4 Hardware"; Information Processing in Sensor Networks, 2008. IPSN '08. International Conference on, IEEE, Piscataway, NJ, USA; Apr. 22, 2008, pp. 356-367, XP031246724; ISBN: 978-0-7695-3157-1; (12 pages). The whole document.

Neugebauer, Marion, et al: "A New Beacon Order Adaptation Algorithm for IEEE 702.15.4 Networks"; Institute for Applied Computer Science, Dresden University of Technology; (c)2005 IEEE; 0-7803-8801, pp. 302-311 (10 pages).

* cited by examiner

FIG. 4

| 1,3,4,5 | 2 | 1,3,4,5 | 2 | 1,3,4,5 | 2 | 1,3,4,5 | 2 |
|---|---|---|---|---|---|---|---|
| Frame | | Frame | | Frame | | Frame | |

LEARNING WIRELESS MEDIUM ACCESS CONTROL FOR DISCRETE EVENT CONTROL SYSTEMS

COPYRIGHT NOTICE

Portions of this document are subject to copyright protection. The copyright owner does not object to facsimile reproduction of the patent document as it is made available by the U.S. Patent and Trademark Office. However, the copyright owner reserves all copyrights in the software described herein and shown in the drawings. The following notice applies to the software described and illustrated herein: Copyright© 2009, Robert Bosch GmbH, All Rights Reserved.

BACKGROUND OF THE INVENTION

1. Field of the Invention

The present invention relates to a method for operating a wireless discrete event control system, and, more particularly, to a method for improving the latency of a wireless discrete event control system.

2. Description of the Related Art

Assembly line manufacturing systems and process control plants often include control loops having several hundred sensors that continually monitor the system performance and provide feedback to a programmable logic controller (PLC). The PLC then, based on the feedback, induces the necessary control actions for controlling the systems. Most existing current day systems employ wired solutions where sensors are connected to the PLC via wires or bus systems.

The use of wireless sensors instead of wired sensors in the control loops can provide several advantages. For instance, the use of wireless sensors may significantly simplify the mechanical design of these machines and lead to more compact designs. Another advantage is that problems caused by wear and tear of cables can be eliminated, thereby leading to reduced maintenance down-time and increased production throughput. Yet another advantage of wireless sensors is that they may provide for easier installation and maintenance. A further advantage of wireless sensors is that they may bring about a reduction in unit cost due to elimination of wire/bus systems and the required associated accessories.

Discrete event control loops in modern day machines often comprise a large number of sensors (e.g., between 50 and 200) reporting to a controller. Many discrete control applications must cater to hard real-time requirements. For example, sensors must communicate the occurrence of critical events to the controller within a real-time deadline (usually between 5 and 50 milliseconds after the occurrence) specified by the control system's design requirements. Messages received after this deadline are considered lost. In the event of traffic bursts wherein several sensors may attempt to communicate with the programmable logic controller (PLC) at the same time, messages from all the sensors must reach within the specified deadline. Thus, the metric for performance in such systems is the probability that a message from all the sensors succeeds in being received at the controller within this deadline.

The operation of several modern day control systems such as computer numerically controlled (CNC) machines, vehicles, manufacturing robot arrays, etc., are based on discrete event control. In a discrete event control system, sensors convey the occurrence of critical events (rather than sampled values of continuous physical phenomena) to a controller. The controller then, based on these sensory inputs from the sensors, induces the necessary actuation to control the system. For example, proximity sensors at a welding unit may detect and notify the arrival of a new work piece to the controller. The controller may then induce a robotic arm to pick the piece up and place it on the welding platform. In another example, some sensors may detect an event such as a possible oil/gas leak and report the same to a central controller. Upon notification, the controller may require shutting down some sections of the system.

The typical modern day discrete event control based CNC machine or vehicle spans between three and fifteen meters along its largest dimension (controller to sensors) and houses between 50 and 200 sensors. For a large number of discrete event control based systems, the control loop must cater to hard real-time requirements. For example, the sensing (detection of the event), communication (sensor to controller and controller to actuator) and actuation must occur within a pre-specified deadline. Given fixed sensing and actuation delays, such deadlines can usually be translated into communication delay deadlines. A message that does not reach its destination before this deadline may cause the machine to go into an error condition that requires its temporary halting or resetting. In machines today, sensors and actuators communicate to the controller via cables and cater to hard real-time communication latencies ranging from five to fifty milliseconds depending on the specifics of the machine.

Inherent to most discrete event control systems is the unpredictable, volatile and "bursty" nature of the traffic. That is, it is difficult to predict when, how many, or which sensors will be triggered to communicate at the same time to the controller. This is because the communication is primarily event driven, and it is often impossible to predict the times and nature of occurrence of external events. In general, traffic bursts are common in most discrete event systems because i) a single event may lead to several sensors triggering at the same time, and ii) more than one event may occur at the same time or very close in time. Such event driven bursts may be referred to herein as "sensor bursts." In the event of a sensor burst, messages from all the sensors must reach the controller within the specified deadline since the controller can take appropriate action only upon receiving all the inputs. Failure of receipt of a message from even one sensor may lead to unpredictable failures in the system, forcing it into an error recovery state.

The design of present day machines requires careful deliberation for routing the cables from various locations within the machine to the controller. Eliminating the cables can not only provide the potential of enabling compact and simple mechanical designs by avoiding cumbersome cabling, but can also provide additional benefits in terms of ease of installation and maintenance. Furthermore, cables are often subject to wear and tear, especially when they are drawn from moving parts within the machine and require frequent maintenance. Each maintenance cycle translates to decreased usage and increased maintenance costs. Elimination of cable wear and tear events translate into lesser maintenance expenditure and fewer down periods. Further, the possibility of wireless sensors encourages the design of systems with a larger number of sensing points for more efficient control.

For most machines, actuators have very high power requirements. The actuators are usually expected to induce mechanical operations such as lifting a part or turning a high speed drill. Thus, actuators cannot be untethered, and require power cables to be routed to them. Making the controller-actuator communication wireless does not offer significant advantages since controller-actuator communication cables can be "bundled" up along with the power lines without significant overhead. Sensors, on the other hand, have modest power requirements, and can be made "completely wireless", operating only on batteries.

Consider the event driven system 10 of FIG. 1 including wireless sensor nodes 12a-e which, when triggered by an external event, communicate its occurrence to a central controller, i.e., master node 14. Controller 14 then, based on the inputs from sensors 12a-e, induces the necessary control action in the system.

In systems such as system 10, it is possible that several sensors are triggered at the same time. This may occur due to a single event triggering several sensors at the same time, or due to more than one event occurring at the same time. For example, consider a system in which sensors are deployed to detect chemical leakage. In the event of a sudden leak, several neighboring sensors may detect the leak at the same time and may try to report this event to the controller, which may then shut certain sections of the plant. In another example, different combination of the same set of sensors may be used to distinguish between different kinds of events. For example, consider a unit with two sensors, a magnetic sensor and a proximity sensor. If the magnetic sensor triggers in combination with the proximity sensor this indicates the presence of a magnetic material. Conversely, if only the proximity sensor is triggered this indicates the presence of a non-magnetic material.

It is possible for a single system to have several independent functional units resulting in sensors from different events being triggered at the same time. In fact, in some cases the inherent dependencies between units may lead to a synchronized firing of several sensors at the same time. Such simultaneous triggering of several sensors may be referred to by the term "sensor burst," as described above. "Sensor burst size" then may be defined as the number of sensors triggering at the same time.

In the event of a sensor burst wherein two or more sensors try to transmit a packet to the controller over the same frequency channel at the same time, then the packets collide and lead to a loss of all the colliding packets. A wireless medium access control (MAC) protocol may be needed to resolve this contention. The two most common approaches to designing MACs include using a round-robin scheme (e.g., time division multiple access (TDMA)) or a contention based scheme (e.g., exponential backoff).

Existing MAC mechanisms include S-MAC, which relies on locally (topologically) synchronizing the sleep and wake up schedules of sensor nodes to increase network longevity; TMAC, which enhances S-MAC's performance under variable load traffic; DSMAC, which allows for an adaptive duty-cycling window to cater to delay-sensitive applications; WiseMAC, which uses spatial TDMA and np-CSMA, where nodes sample the channel periodically to sniff the channel based on wake up schedules that are offset to avoid collisions; TRAMA, which relies on spatial TDMA but includes an additional mechanism to avoid energy wastage due to the problem of hidden terminals not addressed in WiseMAC; DMAC, which is a MAC designed specifically for networks where sensors form a tree topology to transmit data to a base-station, and which provides both low-latencies and longevity by ensuring skewed schedules among various levels in the trees which enable children nodes to transmit exactly when parent nodes are ready to listen; SIFT, which is a contention-based MAC that uses a non-uniform probability distribution to pick transmission slots and exponentially adapts the transmission probabilities on noticing idle slots; PTDMA, which attempts to seamlessly transition between TDMA and CSMA by assigning probabilistic ownerships to slots that are adjusted based on the number of transmitters; and ZMAC, which transitions between TDMA and CSMA seamlessly but is suitable for multihop networks, unlike PTDMA which was designed with single hop networks in mind.

Communication cable-based solutions used in modern day machines typically provide error rates of one in a million or less. A wireless system that replaces an existing system only to become a performance bottleneck is not acceptable as a viable solution.

SUMMARY OF THE INVENTION

The present invention provides a method for transmitting data packets from wireless sensors to a central controller with reduced latency. In an electronic communications context, one definition of "latency" may be the time it takes for a data packet to cross a network connection from a sender to a receiver and be accurately received by the receiver.

The wireless medium access method of the present invention may be used in latency critical applications for reliably delivering data packets from several radios that intend to transmit the data packets to a single node. In a particular embodiment of the invention, radios use the IEEE 802.15.4 standard for wireless sensing in low latency, hard real-time discrete event control applications. A CC2420 radio may be used in conjunction with a medium access code (MAC) protocol to provide error probabilities of less than one in a million within deadlines ranging between five and fifty milliseconds. The invention encompasses qualitative and quantitative generalizations that can be used across other low-power radios based on the IEEE 802.15.4 standard as well. Considering that in the typical scenarios all sensors are within three to fifteen meters of the controller, only single-hop MAC embodiments may be described herein, although the invention may also encompass multi-hop embodiments. Given that MAC protocols ("MACs") are broadly classified into contention-free (packet collisions are avoided) and contention-based (packet collisions are allowed) protocols, a strawman approach may be taken to designing and analyzing the protocols systematically.

Examination of the sources of latency involved in transmitting a packet over a CC2420 radio reveals that some of the bottlenecks found in CC2420 radios are common to most low power radio platforms. According to the invention, it is determined which sensors have historically transmitted signals at the same time and frequency, and such sensors are assigned different time slots and/or frequency channels in which to transmit their signals. The technique of the invention may be used in any time-slotted MAC protocol to more efficiently utilize channels during a sensor burst. Multiple transceivers may be used at the controller because the controller is not power constrained. The use of multiple transceivers may allow packets from several sensors to be received at the same time over different channels, which may help relieve the bandwidth bottleneck at the controller during a sensor burst.

In one embodiment, the invention is directed to a wireless medium access protocol for reliably delivering packets from several radios that intend to transmit information to a single node at the same time for latency critical applications. Due their very nature, most discrete event systems exhibit underlying temporal correlations in the sensory traffic. The present invention utilizes these underlying traffic correlations to significantly enhance performance of the MAC.

The present invention provides a novel MAC that leverages the fact that the operation of most discrete event systems is based on a predetermined set of rules (they are usually finite state machines) that govern the functioning of the controller in reaction to a specific combination and/or sequence of sensory inputs. Each sensory event thus results in a specific sequence of reactions. There may, however, be several independent such sequences occurring within the system at the same time. These underlying temporal correlations in the sensory traffic are exploited by the present invention to design a MAC, leading to significant performance benefits in terms of latency and reliability.

The present invention may statistically identify (by analyzing the sensor traffic) which sensors are likely to be triggered at the same time and may use this information to control a MAC. The statistical analysis may be performed automatically by the master controller which may then use this information to automatically fine tune the MAC as the statistics become increasingly reliable with time, thus a learning MAC system is provided. That is, the MAC system learns and tunes itself to the underlying traffic pattern.

The MAC may control how communication is performed within a machine. The MAC of the present invention may learn communication patterns associated with the particular application, and the MAC may modify itself in response. Thus, parameters of the MAC may be changed in response to the MAC learning the communication patterns.

The invention comprises, in one form thereof, a wireless data transmission method including providing a plurality of radio frequency transmitters. A receiver is provided to receive transmissions from the transmitters. A data format including a plurality of transmission time slots is defined. A first subset of the plurality of transmitters that are apt to send the transmissions simultaneously is determined. Each of the transmitters in the first subset is assigned to a different one of the time slots. A second subset of the plurality of transmitters that are apt to send the transmissions non-simultaneously is determined. Each of the transmitters in the second subset is assigned to a same one of the time slots. The transmitters are used to transmit the transmissions to the receiver in accordance with the assigning steps.

The invention comprises, in another form thereof, a wireless data transmission method including providing a plurality of radio frequency transmitters. A plurality of receivers are provided to receive transmissions from the transmitters. Each of the receivers is configured to receive the transmissions on a respective one of a plurality of frequency channels. A data format including a plurality of transmission time slots is defined. A first subset of the plurality of transmitters that have previously transmitted the transmissions simultaneously and on a same one of the frequency channels is determined. Each of the transmitters in the first subset is assigned to a different one of the frequency channels and/or to a different one of the time slots. A second subset of the plurality of transmitters that have not previously transmitted the transmissions both simultaneously and on a same one of the frequency channels is determined. Each of the transmitters in the second subset is assigned to a same one of the frequency channels and to a same one of the time slots. The transmitters are used to transmit the transmissions to the receivers in accordance with the assigning steps.

The invention comprises, in yet another form thereof, a data transmission method including wirelessly transmitting data packets from a plurality of sensors to at least one receiver. A subset of the sensors whose data packets collided with each other during the step of wirelessly transmitting data packets is determined. Signals are wirelessly transmitted to the sensors in the subset. The signals assign each of the sensors in the subset to a different time slot within a data format and/or a different frequency channel. The step of wirelessly transmitting data packets is repeated such that the data packets are transmitted in accordance with the assignments.

The invention comprises, in still another form thereof, a data transmission method including providing a plurality of radio frequency transmitters. A receiver is provided to receive transmissions from the transmitters. Transmissions of the transmitters are controlled by use of a media access control protocol. Over a period of time, frequencies and times at which each of the transmitters transmits signals are recorded. The media access control protocol is automatically modified based on the recordings. The automatically modifying may include changing time slot or frequency assignments of transmitters that have previously interfered with each other. The recordings may be used to automatically statistically identify which transmitters are likely to be triggered at the same time. The media access control protocol may be automatically modified based on the identifications.

An advantage of the present invention is that signals may be transmitted from a plurality of radio transmitters and received by one or more receivers with decreased latency.

Another advantage is that transmitting sensors do not need to be hard wired to the electronics with which the sensors communicate.

Yet another advantage is that the likelihood of data packet collisions is reduced.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 4 is a diagram of another embodiment of a data frame format for use in a wireless data transmission method of the present invention.

Figure 1:
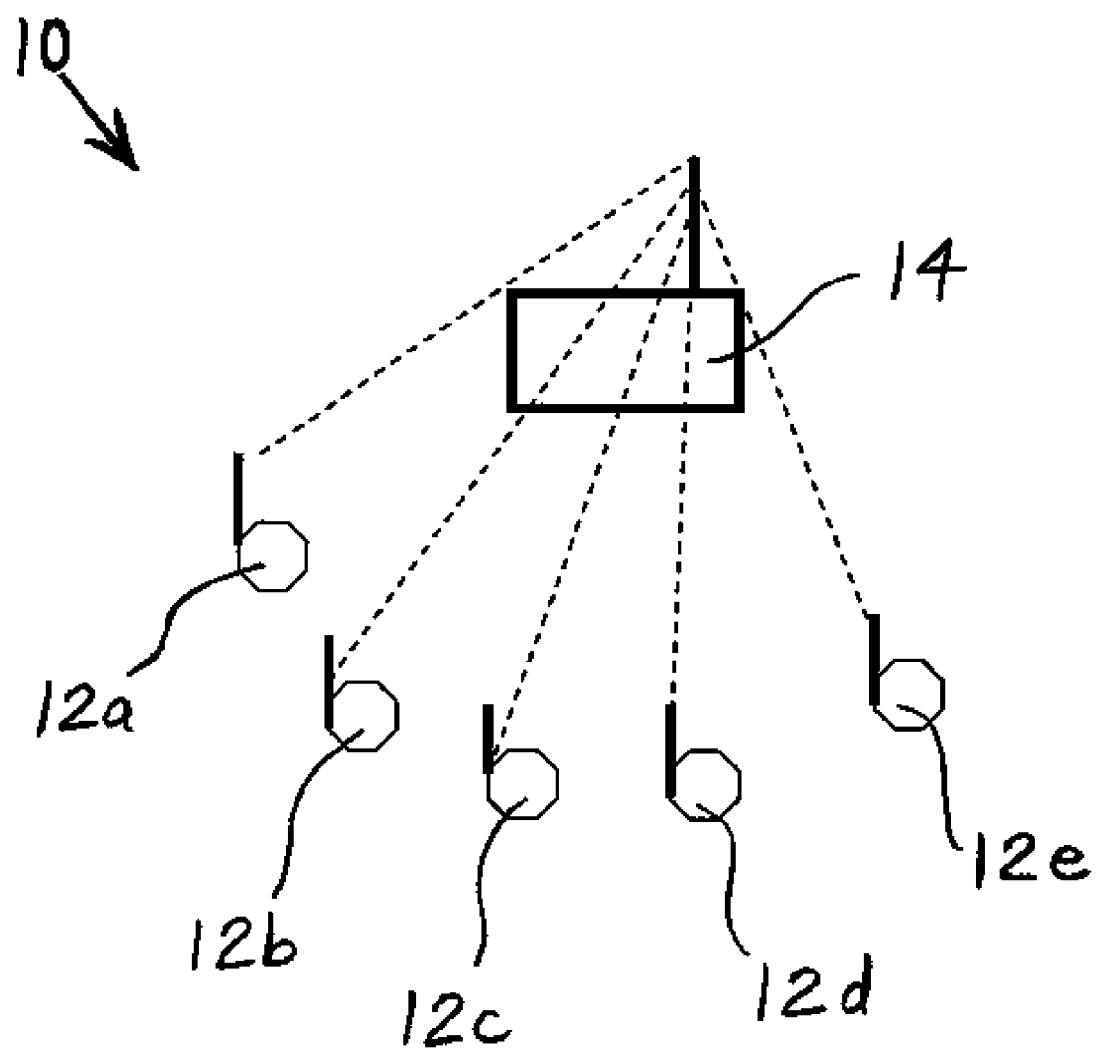
FIG. 1 is a block diagram of a known event driven wireless node system.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Figure 2:
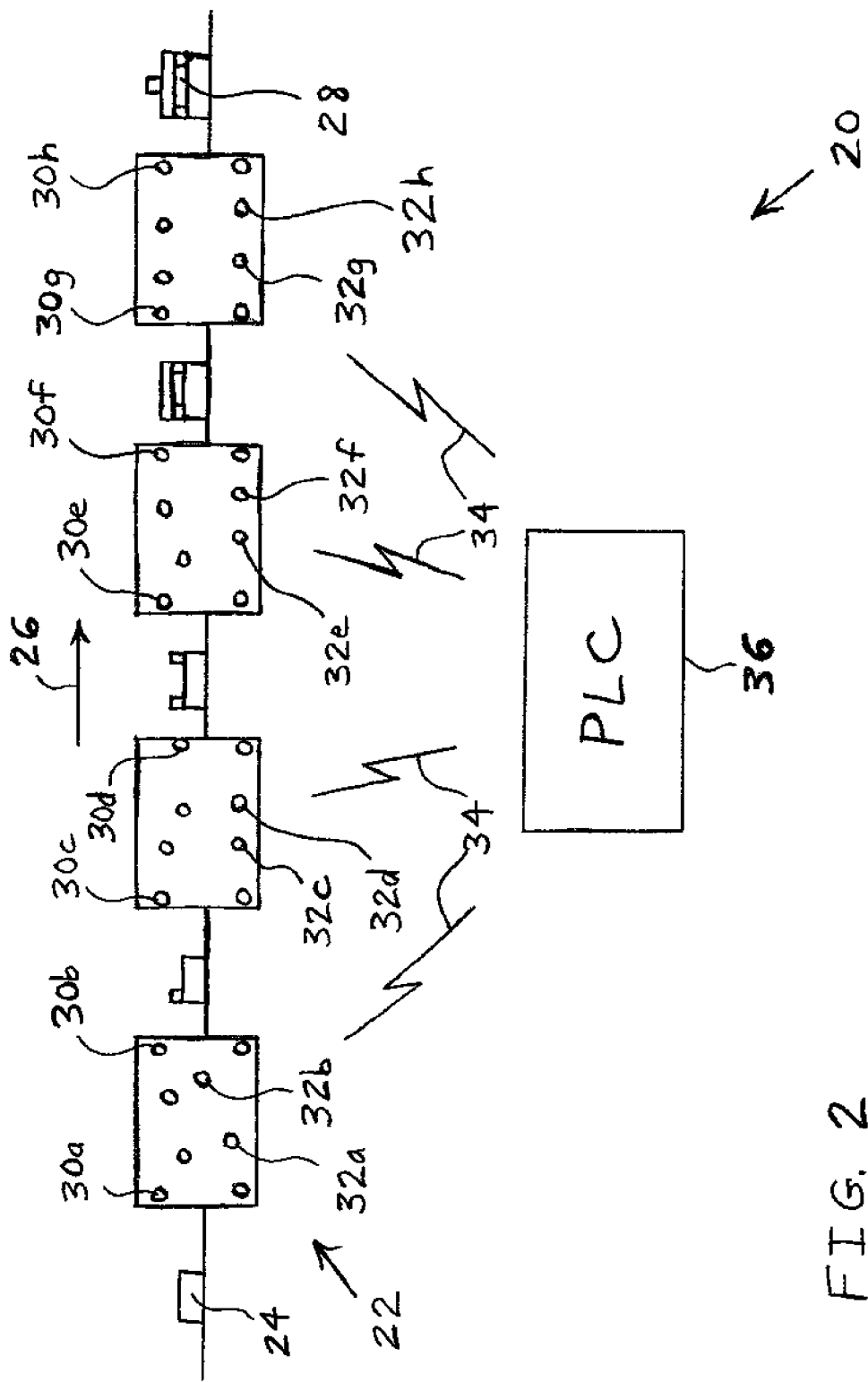
FIG. 2 is a block diagram of a sensor arrangement suitable for use in conjunction with one embodiment of a wireless data transmission method of the present invention.

Referring now to FIG. 2, there is shown one embodiment of a wireless data transmission arrangement 20 of the present invention including a four stage assembly line 22. Raw work piece 24 progresses in a flow direction 26 through the four stages to become processed work piece 28. Each stage may have one or more of sensors 30a-h which may include, for example, proximity sensors to detect the presence of the work piece, and/or position and angle sensors to detect and help orient the work piece. A host of other sensors 32a-h may be provided for helping in the manufacturing process, including temperature and/or pressure sensors, for example. As indicated at 34, all of sensors 30a-h, 32a-h may include transmitters that wirelessly relay sensed information, which may be organized into data packets, to a central control unit, which may be in the form of a programmable logic controller (PLC) 36.

Consider an assembly line including 100 sensors but only a maximum of ten sensors may report data at the same time. One way to accommodate the 100 sensors is to provide them unique time division multiple access (TDMA) slots. However, the latency in such a system does not scale with the number sensors. For example, 100 sensors would require about 100 milliseconds if each packet required one millisecond of transmission time. Because a maximum of only ten sensors simultaneously communicate at any given time, it is wasteful to provide every sensor with a unique transmission time slot.

Figure 3:
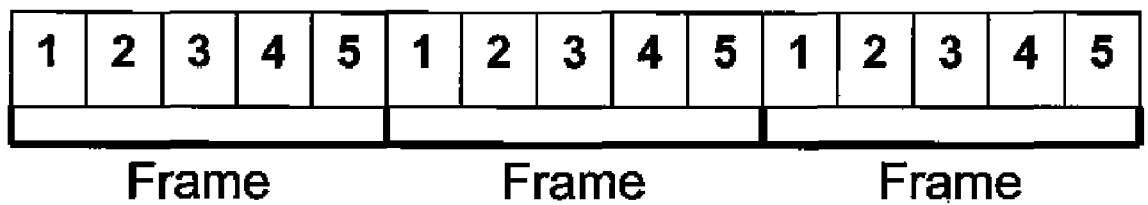
FIG. 3 is a diagram of one embodiment of a data frame format for use in a wireless data transmission method of the present invention.

FIG. 3 illustrates an example in one embodiment of the present invention of a data frame format associated with a data transmission from a transmitter, wherein the data frames are received at the receiver. In the embodiment of FIG. 2, the receiver is included in PLC 36. Consider a five sensor node system. A TDMA MAC developed for this system may employ the data frame format depicted in FIG. 3. Time is divided into frames, and each frame includes five time slots. Each one of the sensors is uniquely assigned to transmit in a respective one of the time slots. In FIG. 3, sensor i, is assigned to transmit in the $i^{th}$ slot. Thus, even if a sensor burst occurs wherein sensors 2, 3 and 4, for example, are triggered at the same time, the three sensors take turns in transmitting data and there are no collisions.

Assuming that it takes one millisecond to transmit a data packet, each frame in the embodiment of FIG. 3 is five milliseconds long. A system with 200 sensor nodes requires 200 slots and thus each frame is 200 milliseconds long. Thus, in a worst case, the delay of transmission (i.e., the time between when an event occurred and when the master controller was notified of the event) can be 200 milliseconds. In real life, where packets may be lost in the wireless channel, a sensor may have to retransmit a few times before the packet reaches the controller and thus it may take a few frames worth of delay for the messages from the triggered sensors to reach the controller.

In one embodiment, the MAC system uses traffic correlations to continuously refine the MAC. Assume that the times of occurrence of the sensors being triggered over a large number of event occurrences are recorded, and it is determined therefrom that the only sensors that are triggered at the same time are sensors 1 and 2. That is, it is determined that none of the other sensors are triggered simultaneously. Thus, the problem of packet collisions occurs among only sensors 1 and 2 and does not occur between other sensors. Instead of the slot-sensor assignment in TDMA depicted in FIG. 3, in the embodiment depicted in FIG. 4, sensor nodes 1, 3, 4 and 5 are assigned to one slot and sensor 2 is assigned to a separate transmission slot.

Figure 5:
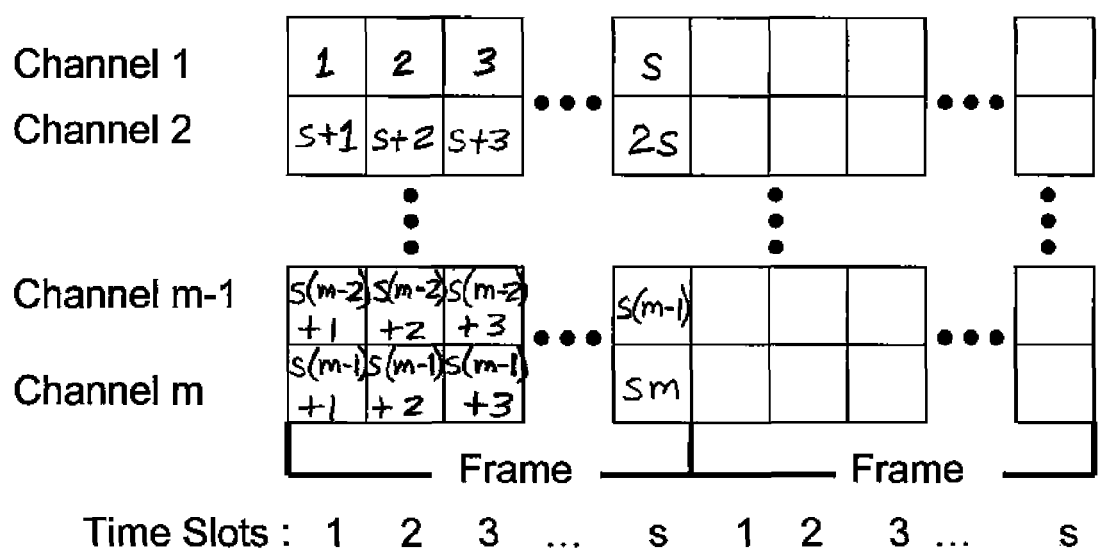
FIG. 5 is a diagram of yet another embodiment of a data frame format including multiple frequency channels for use in a wireless data transmission method of the present invention.

In the frame depicted in FIG. 5, even though sensors 1, 3, 4 and 5 are assigned to the same time slot, signals from these sensors do not collide because these sensors are never triggered at the same time. Because the only sensors that may be triggered at the same time are sensors 1 and 2, and sensors 1 and 2 are assigned to different slots, transmissions from sensors 1 and 2 do not collide. In other words, by using the inherent and/or empirically-observed traffic patterns of the sensors, the present invention may reduce the number of time slots required within a frame. In one embodiment, the frame duration is only two milliseconds (i.e., one millisecond per slot), and thus the transmission latency of the system is reduced by virtue of assigning non-colliding sensors to the same slots. In large 200-sensor-node systems, such a slot assignment based on the underlying traffic patterns can lead to significant reductions in latency since not all sensors are typically triggered at the same time.

According to the present invention, it is determined which sensors can potentially be, or are apt to be, triggered at the same time and which sensors cannot, or will not, be triggered at the same time. A collision set $C_i$ for the $i^{th}$ sensor node may be defined as the set of sensors that can potentially be triggered at the same time as the $i^{th}$ node. Thus, in the example described above with reference to FIG. 4, $C_1=\{2\}$, $C_2=\{1\}$, $C_3=\{\}$, $C_4=\{\}$ and $C_5=\{\}$. Assume that a graph G is created such that each node in G corresponds to a unique sensor node and there exists a shared edge or connecting segment between two nodes i and j if node j belongs to the collision set of i ($C_i$). It is then evident that assignment of the sensors to time slots can be reduced to a graph coloring problem wherein no two connected nodes of G that share a connecting segment or common edge may have the same color. Each color then represents a time slot and all sensors that have been colored the same may be assigned to the same time slot.

In the above-described "overloaded TDMA algorithm," first the contention sets for each sensor are found. As a second step, a contention graph G is created such that each node corresponds to one and only one sensor node. Two nodes in G are connected if and only if they belong to each other's contention set. In a third step, a graph coloring solution is found for G. In a final step, each color is assigned to a unique time slot. All sensors with a certain same color are assigned to transmit in the same time slot.

It may be fairly straightforward to extend overloaded TDMA to overloaded frequency-time division multiple access (FTDMA) where the master controller has multiple transceivers so that it can potentially receive multiple packets simultaneously over different frequency channels. Thus, in another embodiment, time-frequency slots are provided such that every sensor is assigned a time and channel combination in which to transmit data. Each color can correspond to a unique time-channel pair and all nodes with the same color may be assigned the same time-channel slot. A diagram of the frame format in this overloaded FTDMA embodiment is shown in FIG. 5.

In a general MAC of the present invention that is based on underlying traffic patterns, the controller has m number of transceivers that can receive m number of packets at the same time on m number of frequency channels, as illustrated in FIG. 5. Time is divided into frames, and each frame includes several time-frequency slots. In the embodiment of FIG. 5, each frame includes s number of time slots within each frequency channel. Thus, the time-frequency slots within a frame may be numbered from 1 to the product of m multiplied by s. The $i^{th}$ sensor, upon receiving a packet, transmits in slot j with a probability $a_{ij}$. The learning MAC may learn the values of $a_{ij}$ and s by analyzing the underlying traffic pattern in empirical data transmissions.

In one embodiment, the value of $a_{ij}$ can change from frame to frame. There may be several different methods to set or determine the value of $a_{ij}$. One way is to maximize the expected number or percentage of successful packet transmissions, perhaps within a given period of time. The probability that a sensor i's transmission succeeds in slot j may be given by the following formula:

$$a_{ij}\prod_{k, k \ne j}(1 - a_{ik})$$

wherein $\Pi(1-a_{ik})$ denotes the product of the respective probabilities that the sensors other than sensor i do not transmit in slot j. That is, the probability of a sensor i's transmission succeeding in slot j may be given by the probability $a_{ij}$ that the sensor attempts to transmit in slot j multiplied by the probability that no other sensor attempts to transmit in slot j.

Assume that a distribution of which sensors are triggered at the same time is given by $\{e_1, e_2, \ldots, e_{|E|}\}$, wherein this distribution is referred to as E, and wherein e is defined by the set of sensors triggered together $T_e$ and the probability of the burst $P_e$. As an example based upon the five sensor system discussed above, the distribution E may be in the form of:
 $e_1$: T={1}, P=0.17
 $e_2$: T={2}, P=0.15
 $e_3$: T={3}, P=0.16
 $e_4$: T={4}, P=0.16
 $e_5$: T={1,2,3}, P=0.03
 $e_6$: T={1,2}, P=0.10
 $e_7$: T={3,4}, P=0.11
 $e_8$: T={1,3,4}, P=0.03
 $e_9$: T={1,4}, P=0.09

The expected number of successes in a frame may be determined by the sum of the probabilities of successful transmission in each of the slots of the frame. Thus, the expected number of successes in a frame may be given by:

$$J = \sum_e \sum_{i \in T_e} P_e \left( \sum_j a_{ij} \prod_{k, k \ne j}(1 - a_{ik}) \right)$$

J may be maximized to determine suitable values of $a_{ij}$. That is, J may be maximized with respect to $a_{ij}$. After the first frame has been transmitted, the distribution of the remaining sensors in the system may be changed due to some of the sensors having had successfully transmitted and thus no longer competing in frames in the immediate future. Thus, an update may be performed to obtain a new distribution E and the value of $a_{ij}$ may be recalculated. If this process is iterated over and over again, a sequence of $a_{ij}$ values corresponding to each retransmission is produced. This computation may be performed at the master controller based on the collected statistical data. Each node may receive the sequence of $a_{ij}$ values and may use these values to govern the transmission of packets in the slots.

Suitable values for s can be determined by trying several values of s and determining which gives the lowest or most favorable expected latency or another relevant metric. Given that J is in general a non-linear, non-convex function, it may not be a trivial mathematical task to optimize J. Several different heuristic methods may be used to optimize J, including techniques such as genetic algorithms and gradient descent based techniques.

In a general scheme, the master controller of the present invention may fine tune the MAC upon collecting increasing amounts of statistical data to improve the performance of the MAC. The statistical data may include a record of which sensors have had a need in the past to transmit signals at the same time. If two sensors have had a need to transmit concurrently in the past, the two sensors may be assigned slots corresponding to different periods of time, or at least may be assigned slots in different frequency channels.

In general, any application that has strong underlying traffic correlations can use the MAC provided by the present invention. Of notable interest are industrial sensing applications, especially in discrete automation. For example, the present invention may be used in conjunction with assembly line systems in which the statistics are highly predictable and low-latency requirements are crucial.

The present invention provides a method of using underlying sensor traffic correlations to design a MAC for event-triggered wireless sensor-based systems. The MAC may "learn" as additional empirical data is collected regarding which sensors have triggered concurrently. This learning enables the MAC to continually fine tune itself based on accumulated sensor traffic statistics.

More generally, the MAC may observe and keep track of instances in which two sensor transmitters make transmissions at the same time and/or at the same frequency such that the two transmissions may interfere with each other. Thus, the MAC may learn the transmitters' transmission patterns. In order to reduce the number of such interferences, the MAC may modify itself in real time based on its learning. For example, the MAC may change the transmitters' frequency and time slot assignments such that transmitter that have historically interfered with each other will no longer interfere in the same time slots and frequency channels.

Figure 6:
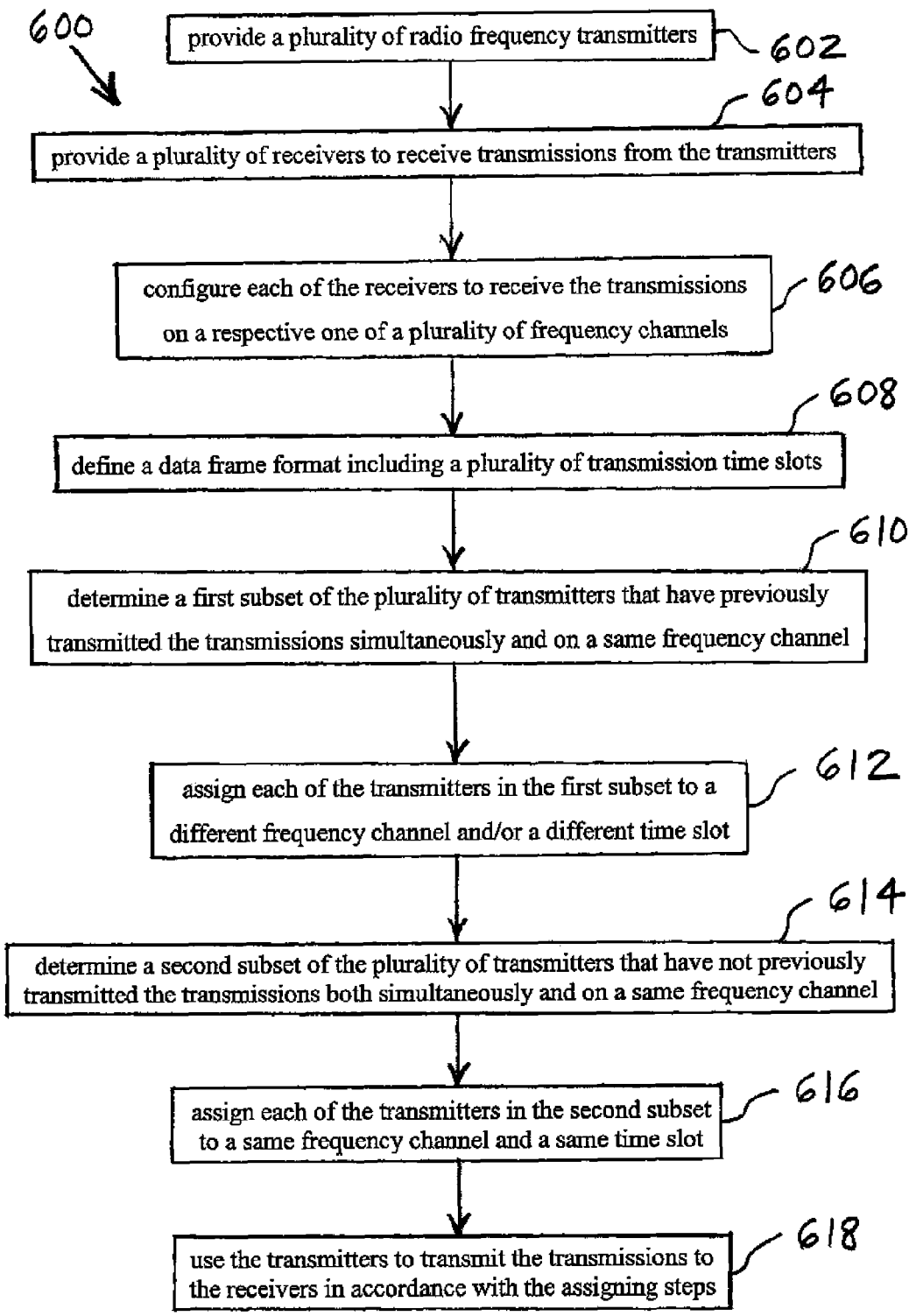
FIG. 6 is a flow chart of one particular embodiment of a wireless data transmission method of the present invention.

One embodiment of a wireless data transmission method 600 of the present invention is illustrated in FIG. 6. In a first step 602, a plurality of radio frequency transmitters are provided. In the specific embodiment illustrated in FIG. 2, for example, a plurality of sensors 30, 32 are provided, wherein each of the sensors includes a radio frequency transmitter.

In a next step 604, a plurality of receivers is provided to receive transmissions from the transmitters. For example, in the embodiment illustrated in FIG. 2, PLC 36 includes a plurality of receivers for receiving sensor data transmissions from the transmitters of the sensors.

Next, in step 606, each of the receivers is configured to receive the transmissions on a respective one of a plurality of frequency channels. That is, each of the receivers is tuned to receive signals transmitted at a separate frequency.

In step 608, a data format is defined including a plurality of transmission time slots. In the embodiment illustrated in FIG. 5, for example, a data frame format is defined including a plurality of transmission time slots organized in m number of channels and s number of time slots per channel. Data may be transmitted from the sensors in each of the transmission time slots. In a particular embodiment, each of the time slots may be of sufficient time duration such that a sensor may transmit all of the data that the sensor has available to transmit within the time constraints of a single time slot.

In a next step 610, a first subset of the plurality of transmitters that have previously transmitted the transmissions simultaneously and on a same frequency channel is determined. That is, the transmitters of sensors 30, 32 may have transmitted transmissions that collided and thus could not be correctly received by a receiver. The receiver may nonetheless determine and record the sensors from which the collided transmissions originated. Such sensors may thus be determined to be in the first subset.

In step 612, each of the transmitters in the first subset is assigned to a different frequency channel and/or a different time slot. That is, each of the transmitters in the first subset may be assigned to a different one of the m×s time slots illustrated in each of the frames in FIG. 5.

Next, in step 614, a second subset of the plurality of transmitters that have not previously transmitted the transmissions both simultaneously and on a same frequency channel is determined. For example, the second subset may include any sensor that has not previously had one of its transmissions collide with a transmission of any other member of the second subset.

In a next step 616, each of the transmitters in the second subset is assigned to a same frequency channel and a same time slot. That is, each of the transmitters in the second subset may be assigned to a same one of the m×s time slots illustrated in each of the frames in FIG. 5.

In a final step 618, the transmitters are used to transmit the transmissions to the receivers in accordance with the assigning steps. That is, the transmitters of the sensors 30, 32 may transmit their data packets in the frequency channels and/or time slots to which the transmitters were assigned in the assigning steps.

Figure 7:
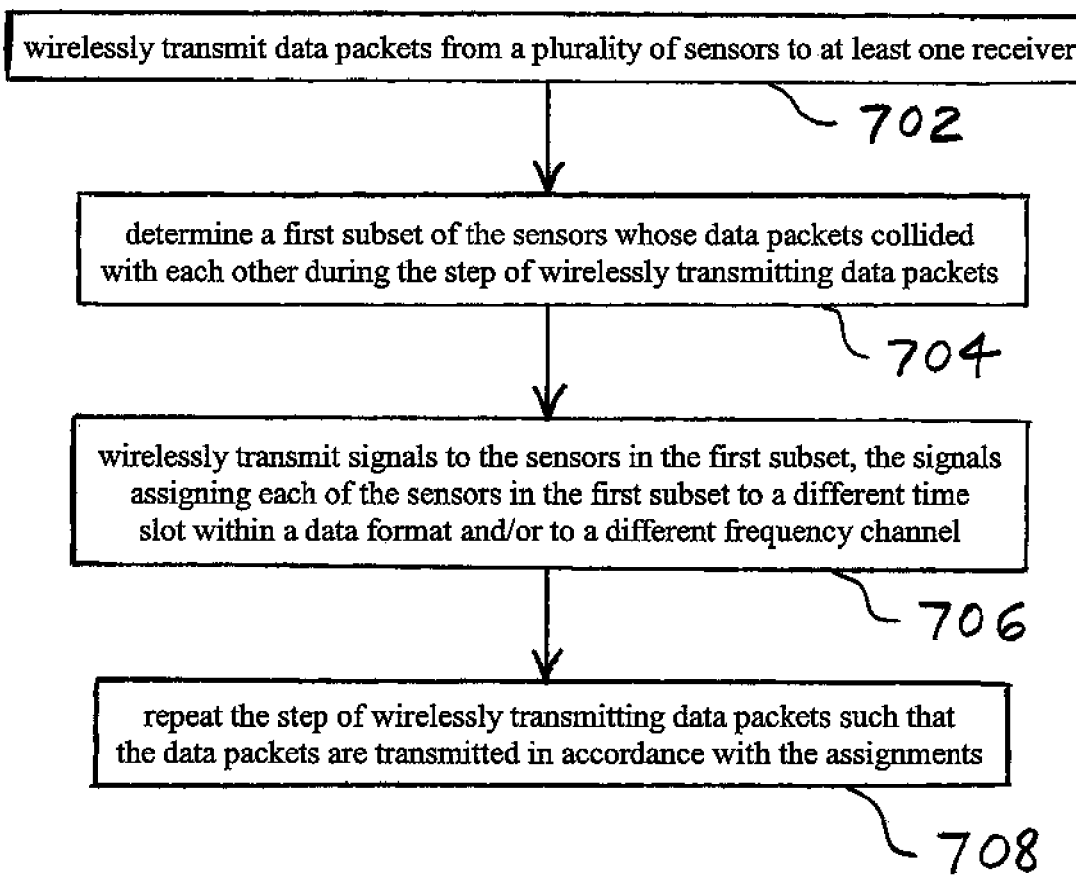
FIG. 7 is a flow chart of another particular embodiment of a data transmission method of the present invention.

FIG. 7 illustrates another embodiment of a data transmission method 700 of the present invention. In a first step 702, data packets from a plurality of sensors are wirelessly transmitted to at least one receiver. In the specific embodiment illustrated in FIG. 2, for example, a plurality of sensors 30, 32 are provided, wherein each of the sensors includes a radio frequency transmitter. Data packets from sensors 30, 32 are wirelessly transmitted to at least one receiver in PLC 36.

In a next step 704, a subset of the sensors whose data packets collided with each other during the step of wirelessly transmitting data packets is determined. For example, ones of the sensors 30, 32 whose transmitted data packets collided with each other, as evidenced by the data packets being incorrectly received, may be included in a first subset.

Next, in step 706, signals are wirelessly transmitted to the sensors in the subset, the signals assigning each of the sensors in the subset to a different time slot within a data format and/or to a different frequency channel. For example, in the embodiment illustrated in FIG. 2, PLC 36 may wirelessly transmit signals to sensors 30, 32 whose data packets have previously collided, wherein the signals assign a different one of the m×s time slots of FIG. 5 to each of these collision-apt sensor transmitters.

In a final step 708, the step of wirelessly transmitting data packets is repeated such that the data packets are transmitted in accordance with the assignments. For example, the transmitters in the sensors may be used to transmit sensor data transmissions to the receiver of PLC 36 such that the sensors in the subset, which are assigned to particular time slots, do indeed transmit their data packets within the assigned time slots.

The underlying sensor traffic characteristics of a machine depend on its construction, its interaction with neighboring machines, its operating conditions, and its environment. In fact, traffic characteristics may themselves change with time as the operating conditions (e.g., high load, low load in case of a manufacturing system) change. Thus, in one embodiment, the MAC may be manually reset by an operator to ignore, or at least give less weight to, older data that was collected before the change in traffic characteristics. In another embodiment, the MAC automatically recognizes changes in traffic characteristics by use of additional sensors or by analysis of the data. After recognizing changes in traffic characteristics, the MAC may automatically ignore, or at least give less weight to, older data that was collected before the change in traffic characteristics.

In the above-described embodiments, actual packet collisions are determined and recorded in order to assign time slots to the transmitters whose packets are apt to collide. However, in another embodiment, a master controller may assign time slots on the basis of ascertaining which transmitters are apt to have their packets collide in the future. This determination of which transmitters are apt to have their packets collide in the future may be based on any factors known to or sensed by the master controller that are related to the likelihood of future packet collisions. Such factors may include the type of sensors with which the transmitters are associated, the physical proximity of the transmitters, environmental conditions, etc.

The present invention has been described herein as being applied to wireless sensors in an assembly line environment. However, it is to be understood that the present invention may be applied to other applications in which multiple wireless transmitters attempt to transmit relatively short messages to a same receiver at approximately the same point in time.

The present invention has been described herein as being applied to wireless sensors. However, it is to be understood that the present invention may also be applied to applications including wired sensors.

While this invention has been described as having an exemplary design, the present invention may be further modified within the spirit and scope of this disclosure. This application is therefore intended to cover any variations, uses, or adaptations of the invention using its general principles.

What is claimed is:

1. A wireless data transmission method, comprising:
providing a plurality of radio frequency transmitters;
providing a receiver to receive transmissions from the transmitters;
defining a data frame format including a plurality of transmission time slots;
determining a first subset of the plurality of transmitters that are apt to send the transmissions simultaneously;
assigning each of the transmitters in the first subset to a different said time slot;
determining a second subset of the plurality of transmitters that are apt to send the transmissions non-simultaneously;
assigning each of the transmitters in the second subset to a same said time slot; and
using the transmitters to transmit the transmissions to the receiver in accordance with the assigning steps.

2. The method of claim 1 wherein the step of determining a first subset of the transmitters includes detecting which of the transmitters have transmitted data packets that have collided with data packets transmitted by other ones of the transmitters.

3. The method of claim 2 wherein the step of determining a second subset of the transmitters includes detecting which of the transmitters have not transmitted data packets that have collided with data packets transmitted by other ones of the transmitters.

4. The method of claim 1 wherein each of the transmitters is associated with a respective sensor.

5. The method of claim 1 wherein each of the assigning steps includes transmitting signals from the receiver to the transmitters.

6. The method of claim 1 wherein the data frame format includes a plurality of frequency channels.

7. The method of claim 1 wherein the transmissions comprise data packets.

8. A wireless data transmission method, comprising:
providing a plurality of radio frequency transmitters;
providing a plurality of receivers to receive transmissions from the transmitters;

configuring each of the receivers to receive the transmissions on a respective one of a plurality of frequency channels;

defining a data frame format including a plurality of transmission time slots;

determining a first subset of the plurality of transmitters that have previously transmitted said transmissions simultaneously and on a same said frequency channel;

assigning each of the transmitters in the first subset to at least one of a different said frequency channel and a different said time slot;

determining a second subset of the plurality of transmitters that have not previously transmitted said transmissions both simultaneously and on a same said frequency channel;

assigning each of the transmitters in the second subset to a same said frequency channel and a same said time slot; and using the transmitters to transmit the transmissions to the receivers in accordance with the assigning steps.

9. The method of claim 8 wherein the step of determining a first subset of the transmitters includes detecting which of the transmitters have transmitted data packets that have collided with data packets transmitted by other ones of the transmitters.

10. The method of claim 9 wherein the step of determining a second subset of the transmitters includes detecting which of the transmitters have not transmitted data packets that have collided with data packets transmitted by other ones of the transmitters.

11. The method of claim 8 wherein each of the transmitters is associated with a respective sensor.

12. The method of claim 8 wherein each of the assigning steps includes transmitting signals from the receiver to the transmitters.

13. The method of claim 8 wherein the transmissions comprise data packets.

14. The method of claim 8 wherein the receivers are included within a single programmable logic controller.

* * * * *